(12) United States Patent
Lavrov et al.

(10) Patent No.: US 10,372,839 B2
(45) Date of Patent: Aug. 6, 2019

(54) PROJECT MANAGEMENT SYSTEM PROVIDING OPTIMIZED INTERACTION WITH DIGITAL MODELS

(71) Applicant: LATISTA Technologies, Inc., Reston, VA (US)

(72) Inventors: Andrei Lavrov, Chevy Chase, MD (US); Anatoliy Tishin, Reston, VA (US); Patricia Remacle, Reston, VA (US)

(73) Assignee: LATISTA TECHNOLOGIES, INC., Reston, VA (US)

(*) Notice: Subject to any disclaimer, the term of this patent is extended or adjusted under 35 U.S.C. 154(b) by 676 days.

(21) Appl. No.: 14/571,522

(22) Filed: Dec. 16, 2014

(65) Prior Publication Data

US 2015/0169791 A1    Jun. 18, 2015

Related U.S. Application Data

(60) Provisional application No. 61/916,613, filed on Dec. 16, 2013.

(51) Int. Cl.
| | | |
|---|---|---|
| *G06F 17/50* | (2006.01) | |
| *G06Q 10/10* | (2012.01) | |
| *G06T 19/00* | (2011.01) | |
| *H04L 29/08* | (2006.01) | |

(52) U.S. Cl.
CPC ....... *G06F 17/5004* (2013.01); *G06Q 10/103* (2013.01); *G06T 19/00* (2013.01); *H04L 67/1097* (2013.01); *H04L 67/2828* (2013.01); *H04L 67/36* (2013.01); *G06F 2217/04* (2013.01)

(58) Field of Classification Search
CPC ............ G06F 17/5004; G06F 2217/04; G06Q 10/103; G06T 19/20; H04L 67/10; H04L 67/1097; H04L 67/2828; H04L 67/36

USPC ............................................................ 703/2
See application file for complete search history.

(56) References Cited

U.S. PATENT DOCUMENTS

| | | | |
|---|---|---|---|
| 7,831,628 B1 | 11/2010 | Silva et al. | |
| 8,548,992 B2 | 10/2013 | Abramoff et al. | |
| 8,583,462 B2 | 11/2013 | Podgurny et al. | |
| 8,700,310 B2 | 4/2014 | Jayanthi | |
| 8,732,125 B2 | 5/2014 | Omansky et al. | |
| 9,019,269 B1* | 4/2015 | Pogue | G06T 15/506 |
| | | | 345/419 |
| 2007/0083517 A1 | 4/2007 | Prince et al. | |

(Continued)

OTHER PUBLICATIONS

Defining a Linear View fora PDF Form, dated Sep. 11, 2014, pp. 1-2, LATISTA Server Edition On-line Help, LATISTA Technologies, Reston, Virginia.
Babak Jalalzadeh Fard, Construction smart forms: an application of information technology to reduce waste by increasing interoperability, dated Jan. 1, 2011, pp. 1-137, Civil Engineering Master's These, Northeastern University, Boston, Massachusetts.

(Continued)

*Primary Examiner* — Kamini S Shah
*Assistant Examiner* — John E Johansen
(74) *Attorney, Agent, or Firm* — Kraguljac Law Group, LLC

(57) ABSTRACT

Systems and methods provide rendering of and interaction with digital building information modeling (BIM) models. The BIM models may be used for project management processes in the field. The BIM models may also be shared across multiple devices in the field, and received from cloud-based services in communication with the devices.

20 Claims, 9 Drawing Sheets

(56) References Cited

U.S. PATENT DOCUMENTS

| | | | | |
|---|---|---|---|---|
| 2008/0065456 | A1* | 3/2008 | Labedz | G06Q 10/06 709/229 |
| 2010/0077316 | A1 | 3/2010 | Omansky et al. | |
| 2010/0280836 | A1* | 11/2010 | Lu | G08B 7/062 705/1.1 |
| 2011/0093619 | A1 | 4/2011 | Nelson | |
| 2011/0169826 | A1* | 7/2011 | Elsberg | G06T 15/005 345/419 |
| 2011/0276886 | A1* | 11/2011 | Hall | G06Q 10/06 715/734 |
| 2012/0066178 | A1 | 3/2012 | Omansky et al. | |
| 2012/0116728 | A1* | 5/2012 | Shear | G06F 17/50 703/1 |
| 2012/0310602 | A1* | 12/2012 | Jacobi | G06F 17/5004 703/1 |
| 2012/0310906 | A1* | 12/2012 | Miller | G06F 17/5004 707/695 |
| 2012/0331061 | A1 | 12/2012 | Lininger | |
| 2013/0090965 | A1 | 4/2013 | Rivere | |
| 2013/0179354 | A1 | 7/2013 | Seat | |
| 2013/0235029 | A1 | 9/2013 | Keough et al. | |
| 2013/0304533 | A1 | 11/2013 | Nudd et al. | |
| 2013/0338971 | A1 | 12/2013 | Chao et al. | |
| 2014/0039955 | A1 | 2/2014 | Lee et al. | |
| 2017/0329876 | A1* | 11/2017 | Cockburn | G06T 15/00 |

OTHER PUBLICATIONS

Ibrahiem Abdul Razak Alani et al., Artificial Intelligence Expert System for Minimizing Sold Waste During Highway Construction Activities, dated Mar. 18, 2009, pp. 1-4, Proceedings of the International MultiConference of Engineers and Computer Scientest 2009 vol. I IMECS, Hong Kong, China.

LATISTA Commissioning Mobile and Cloud Feature Overview, dated Feb. 21, 2013, all screens of video, LATISTA Software, Video available at http://www.youtube.com/watch?v=WOym6ngHKj8.

LATISTA Visual Punch List or Punch on Plan Features Overview, dated Feb. 21, 2013, all screens of video, YouTube, LATISTA Software, Video available at http://www.youtube.com/watch?v=9pX_FoGdVwg.

LATISTA Brings BIM to the Field, dated Dec. 5, 2013, all screens of video, LATISTA Software, Video available at http://www.forconstructionpros.com/video/11267932/video-lastista-brings-bim-to-the-field and http://www.youtube.com/watch?v=GOdDoyre_QU.

International Search Report, dated Mar. 17, 2015, pp. 1-2, International Application No. PCT/US2014/070519, International Search Authority—US.

EP Office Action dated Jul. 17, 2018 in co-pending EP Application No. 14872736.5 filing date of Jun. 22, 2016.

Daryl Gregoire: REVIT Rocks!: REVIT View Discipline Explained—Kind of, Sep. 12, 2012, pp. 1-6; downloaded from the internet at: http://revitrocks.blogspot.com/2012/09/revit-view-discipline-explained-kind-of.html.

* cited by examiner

PROJECT MANAGEMENT SYSTEM PROVIDING OPTIMIZED INTERACTION WITH DIGITAL MODELS

This application claims priority under 35 USC § 119 to U.S. Provisional Patent Application 61/916,613, entitled "PROJECT MANAGEMENT SYSTEM PROVIDING OPTIMIZED INTERACTION WITH DIGITAL MODELS" filed Dec. 16, 2013, the entire contents of which are incorporated by reference.

FIELD

The present disclosure relates generally to project management, and, more particularly, to systems and methods for providing rendering of and interaction with digital building information modeling (BIM) models for use in project management processes.

BACKGROUND

In general, project management is understood to include planning, organizing, motivating, and controlling resources to achieve specific goals. In the construction industry, for example, construction management firms may be engaged in medium and large projects (e.g., sport stadiums, hospitals and healthcare facilities, office buildings, power plants, manufacturing facilities, airports, seaports and railway terminals, multi-unit residential complexes, etc.). Throughout the entire process of construction (e.g., from planning to handover), large teams of construction professionals and specialists may have to be managed so as to ensure that all aspects of the construction project (e.g., partnering, estimating, purchasing, scheduling, engineering, safety, community relations, etc.) go smoothly to produce high-quality projects on time.

Conventionally, coordinating such large teams involved a lot of paperwork, including documentation related to data in the field. This is especially true in performing field management, punch list management, quality, commissioning, turn-over and safety management, and warranty- and maintenance-related functions. Such documents include, but are not limited to, field inspections, punch lists, vendor lists, resource lists, and task lists. Consequently, firms have sought processes that keep their project coordinators and subcontractors on the job site working (i.e., building and maintaining), rather than in an office shuffling papers. Furthermore, the use of documentation may slow down productivity simply due to the fact that not all of the field personnel may have access to the recorded field data, thus possibly leading to work duplication, unnecessary communications, or other cost-increasing problems.

As a result, some systems have been developed that provide project management via wireless computing devices and cloud-based servers, wherein data related to construction processes (e.g. field inspection data, punch list data, commissioning data, etc) may be more easily recorded in the field (i.e., on a computing device) and more easily exchanged between personnel (i.e., synchronization of data between computing devices), thereby improving the overall construction process.

While current management systems and software may overcome some of the drawbacks of conventional construction management (i.e. paperwork and disorganization), such systems have drawbacks. For example, throughout the lifecycle of a construction project (e.g., from initial conception and planning through completion and turnover) it is important to assure and verify that all (or some, depending on the scope) systems and components of a building, for example, are designed, installed, tested, operated, and maintained according to the operational requirements of the owner or final client. This may include verifying the subsystems for mechanical (HVAC), plumbing, electrical, fire/life safety, building envelopes, interior systems (example laboratory units), cogeneration, utility plants, sustainable systems, lighting, wastewater, controls, and building security to achieve the owner's project requirements as intended by the building owner and as designed by the building architects and engineers.

As part of the assurance process, building information modeling (BIM) may be used, particularly with respect to a construction project, to ensure that the systems and components of a building, for example, are designed, installed, tested, operated, and maintained according to the building design. BIM is a digital representation of physical and functional characteristics of a facility. Architects and/or sub-contractors may utilize BIM programs and software to build detailed, three-dimensional (3D) BIM models of construction projects before ground is even broken. These 3D models may include informational data associated with the construction project, including geometry, spatial relationships, geographic information, quantities and properties of building components, equipment information, and detailed layouts and dimensions of the building. BIM models may be relied upon to resolve in-field conflicts during the construction process before they arise. With the use of BIM models, construction teams may coordinate their efforts using a 3D representation of a building that enables them to easily visualize the architectural and engineering designs that govern how construction should proceed.

Current project management systems and software lack flexibility when carrying out certain functions, such as the commissioning process. In particular, current systems may lack the ability to provide access to BIM models in the field. In turn, users in the field have limited access to informational data, such as types, quantities, properties, and placement of building components, as well as any changes or revisions to the overall building design, thereby reducing the BIM model's effectiveness in avoiding conflicts and preventing the need for re-work during the commissioning process. In turn, the lack of accessibility of BIM model in the field may result in increased costs, time delays, as well as potential risks of injury in the event that certain components are incompatible with one another.

SUMMARY

The present invention provides systems and methods for construction field management. In one aspect, a system is configured to provide field management services and facilitate an online platform web-application for carrying out one or more functions related to construction field management. The system is configured for use by capital business owners, commissioning agents, and construction management firms and their subcontractors/vendors for management of the construction project, wherein the application optimizes a variety of field operations, improving performance and effectiveness of field workers or any other type of mobile workers.

The system generally includes one or more mobile devices configured to communicate with a remote server or cloud-based service. The mobile devices may generally include a mobile computing device configured to run the construction field management software thereon. For example, a mobile device consistent with the present disclosure may include a tablet PC for field-based personnel configured to synchronize with the server and/or cloud-based server and dynamically exchange field data related to one or more construction processes. Each mobile device may communicate with one another, by way of the server and/or cloud-based server, such that each field-personnel has access to ongoing constructions processes and related field data.

The mobile devices may be synchronized with the server and/or cloud-based service on a regular basis to make data records consistent and up-to-date. In a synchronization process, data record changes may be propagated from one mobile device to another, via the server or cloud-based service. In one aspect, such synchronization is based on a data record replication mechanism where all the necessary data records are transmitted to mobile devices in advance. The replication mechanism then assumes that all the mobile device users may work "off-line" and go "on-line" only to connect to a server to "sync." Mobile device users may modify or delete existing data records and add new data records to the replicated data records in the course of their field work. All user-made modifications and replication of new data records may take place during next synchronization. Synchronization also may be used to initialize any newly-installed mobile device version of the application.

In one aspect, the system may include a field management system for executing the application, wherein the field management system may be implemented on each mobile device and/or the server and/or cloud-based service. The field management system includes a BIM module for generally managing the rendering of and interaction with 3D BIM models on a mobile device in the field. The BIM module may generally provide a user with a mechanism for rendering a BIM model for display on the mobile device and further enables a user to interact with the rendered BIM model so as to ensure the construction project is being carried out according to plan. The BIM module includes a rendering module configured to receive BIM data (e.g., created 3D BIM model) from an existing BIM design program, for example, or any other source of BIM data. The BIM data may include a BIM model (e.g., 3D geometry) and associated data, including, but not limited to, data such as viewpoints for navigating the model, a list of equipment included within the model, and properties for each piece of equipment. The building information modelling data may also include more than just 3D geometry for a building, including digital photos or images; item quantity and quality; inspection data and reports; facility, equipment, or building issue reports; work history; work person names, commissioning information and forms, or other data. The rendering module is configured to process and transform the BIM data into a format that is compatible with one or more project management systems consistent with the present disclosure. As such, the rendering module may include an extraction and transformation module configured to receive, process, and transform BIM data from a variety of currently available BIM solutions, including, but not limited to, AUTODESK® NAVISWORKS® software. Accordingly, the BIM module may be compatible with other existing BIM design programs and solutions and is therefore not limited by the type of BIM data that may be received and rendered. The rendering module is further configured to render a 3D BIM model of the transformed BIM data and provide a visual rendering on the display of the mobile device.

The BIM module further includes an interaction module generally configured to provide a user with a mechanism for interacting with the rendered 3D BIM model, as well as informational data associated with the rendered 3D BIM model. For example, the interaction module is configured to receive user input from one or more input devices, such as, for example, a peripheral device, a keypad, touch-screen display, microphone, and/or camera. In response to user input, the interaction module is configured to enable a user to interact and work directly with the rendered BIM model and the associated informational data. The interaction module is further configured to enable a user to manipulate one or more aspects of the BIM model, such as a specific view, layer, location, and/or component of interest (e.g., piece of equipment) within the BIM model, effectively filtering the rendered BIM model so as to highlight a portion of interest in the BIM model. The interaction module is further configured to enable a user to include user input data to the filtered BIM model, such as notes or indicia (e.g., arrows) associated with the portion of interest in the filtered BIM model. The user input data may indicate areas of concern or issues that may require attention and/or correction.

The user and/or the mobile device may then save the filtered BIM model, which may be stored in the cloud-based service to share with other users on their respective mobile devices, thereby enabling other distributed users to view the filtered BIM model. Accordingly, upon accessing the saved filtered BIM model, the additional data is visible to other users and may be relied upon so as to ensure the building project is going as planned, such as during the commissioning process.

Systems and methods consistent with the present disclosure provide a mechanism for rendering a BIM model on a user's device in the field and further provide an intuitive mechanism for facilitating user interaction with the rendered BIM model. The system enables manipulation and subsequent filtering of the BIM model so as to capture one or more portions of interest, such as a specific location, layer, and/or component of the building project, and further include user data associated with the portion of interest, such as annotations attached to the filtered BIM model, so as to alert others of an issue or concern, as well as any changes or revisions that may be required or desired. The annotations may include specific notes and/or images and/or voice recordings which may provide details regarding the portion of interest and any issues, changes and/or revisions that are required or desired. The system further facilitates access to the filtered BIM model by way of a cloud-based service, such that multiple users in the field may have access to the filtered BIM model, thereby reducing the risk of potential conflicts and limiting the need for re-work during the commissioning process, saving time and money, as well as reducing the risk of injury.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Figure 1:
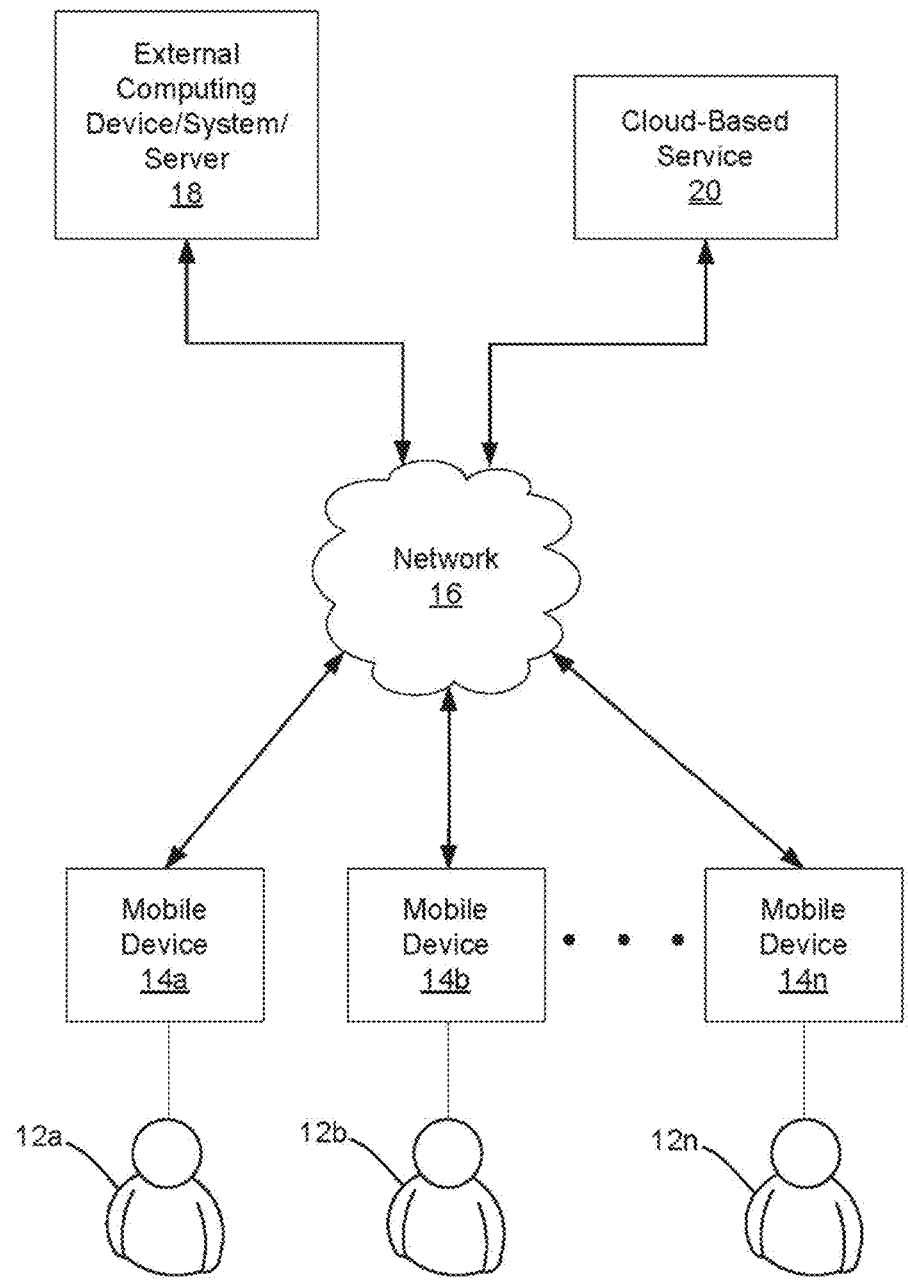
FIG. 1 is a block diagram illustrating one embodiment of an exemplary system for providing field management services and facilitating an online platform web-application for carrying out one or more functions related to construction field management.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure is generally directed to systems and methods for construction field management. In some embodiments, the system is configured to provide field management services and facilitate an online platform web-application for carrying out one or more functions related to construction field management. The system may be configured for use by capital business owners, commissioning agents and construction management firms and their subcontractors/vendors for management of the construction project. The system may be configured to optimize a variety of field operations, improving performance and effectiveness of field workers.

The system generally includes one or more mobile devices configured to communicate with a remote server or cloud-based service. The mobile devices may generally include a mobile computing device configured to run the construction field management software thereon. For example, a mobile device consistent with the present disclosure may include a tablet PC for field-based personnel configured to synchronize with the server and/or cloud-based server and dynamically exchange field data related to one or more construction processes. Each mobile device may communicate with one another, by way of the server and/or cloud-based server, such that each field-personnel has access to ongoing constructions processes and related field data.

The mobile devices may be synchronized with the server and/or cloud-based service on a regular basis to make data records consistent and up-to-date. In a synchronization process, data record changes may be propagated from one mobile device to another, via the server or cloud-based service. In one aspect, such synchronization is based on a data record replication mechanism where all the necessary data records are transmitted to mobile devices in advance. The replication mechanism then assumes that all the mobile device users may work "off-line" and go "on-line" only to connect to a server to "sync." Mobile device users may modify or delete existing data records and add new data records to the replicated data records in the course of their field work. All user-made modifications and replication of new data records may take place during next synchronization. Synchronization also may be used to initialize any newly-installed mobile device version of the application.

In one embodiment, the system may include a field management system for executing the application, wherein the field management system includes modules for such important areas of Quality Management, Punch List Management, Safety Management, Production Tracking, Commissioning, Document Management, Report Management, Inventory or other Item Management, and building information modeling (BIM). The field management system may be implemented on each mobile device and/or the server and/or cloud-based service.

The BIM module of the field management system generally manages the rendering of and user interaction with 3D BIM models on a mobile device in the field. The BIM module provides a user with a mechanism for rendering a BIM model for display on the mobile device and further enables a user to interact with the rendered BIM model so as to ensure the construction project is being carried out according to plan. The BIM module includes a conversion and rendering module configured to receive BIM data (e.g., created 3D BIM model), either native to BIM software on the mobile device or from any other existing BIM programs. Accordingly, the BIM module may be compatible with existing BIM programs and is therefore not limited by the type of BIM data that may be received and rendered. The rendering module is configured to process the BIM data and render a 3D BIM model and provide a visual rendering on the display of the mobile device.

The BIM module further includes an interaction module generally configured to provide a user with a mechanism for interacting with the rendered 3D BIM model, as well as informational data associated with the rendered 3D BIM model. For example, the interaction module is configured to receive user input from one or more input devices, such as, for example, a peripheral device, a keypad, touch-screen display, microphone, and/or camera. In response to user input, the interaction module is configured to enable a user to interact and work directly with the rendered BIM model and the associated informational data. The interaction module is further configured to enable a user to manipulate one or more aspects of the BIM model, such as a specific view, layer, location, and/or component of interest (e.g., piece of equipment) within the BIM model, effectively filtering the rendered BIM model so as to highlight a portion of interest in the BIM model. The interaction module is further configured to enable a user to include user input data to the filtered BIM model, such as notes or indicia (e.g., arrows) associated with the portion of interest in the filtered BIM model. The user input data may indicate areas of concern or issues that require attention and/or correction.

The user may then direct the mobile device to save the filtered BIM model, which may be stored in the cloud-based service to share with other users on their respective mobile devices, thereby enabling other distributed users to view the filtered BIM model. Accordingly, upon accessing the saved filtered BIM model, the additional data is visible to other users and may be relied upon so as to ensure the building project is going as planned, such as during the commissioning process.

Systems and methods consistent with the present disclosure may provide a mechanism for rendering a BIM model on a user's device in the field and further provide a mechanism for enabling user interaction with the rendered BIM model. The system enables manipulation and subsequent filtering of the BIM model so as to capture one or more portions of interest, such as a specific location, layer, and/or component of the building project, and further include user data associated with the portion of interest, such as annotations attached to the filtered BIM model, so as to alert others of an issue or concern, as well as any changes or revisions that may be required. The annotations may include specific notes and/or images and/or voice recordings which may provide details regarding the portion of interest and any issues, changes and/or revisions required. The system is further configured to provide the filtered BIM model, including any annotations attached thereto, to other users in the field. More specifically, the system provides multiple users in the field with access to the filtered BIM model by way of a cloud-based service.

In one embodiment, the BIM model, including attached annotation(s), may be used to trigger a workflow issue transaction notification, thereby notifying the appropriate party (e.g., field personnel) and making them aware of the issue or revision included and made note of in the filtered BIM model. For example, in the event that there is an electrical issue (e.g., incorrect electrical component installed) in a particular room of a building, the filtered BIM model may include a view of the building with that room highlighted, including annotations noting the incorrect electrical component and the correct component that needs to be installed. The filtered BIM model may then be included in a workflow issue transaction notification to the electrician (e.g., a responsible party). Upon receiving notification, the electrician may retrieve and interact with the filtered BIM model and review the highlighted portion of interest and the issue the needs to be resolved or revision that needs to be made based on the attached annotation(s).

The workflow issue transaction notification may be any notification that indicates an issue may exist that is to be addressed as part of a workflow. Accordingly, the workflow issue transaction notification may be referred to as a notification of an issue to be addressed in a workflow transaction. Examples of the notification may include an e-mail, an instant message, a text message, or any other type of message that may be communicated to a user. The notification may identify the issue, the workflow, and/or the workflow transaction. The workflow transaction may be a step in the workflow. Accordingly, systems and methods consistent with the present disclosure provide an improved mechanism of carrying out project management by way of enabling rendering and interaction with BIM models during the construction process so as to coordinate work as it is being performed and to inspect and/or verify that the work performed met quality criteria, thereby reducing the risk of potential conflicts and preventing the need for re-work, saving time and money.

In another aspect, systems and methods of the present invention may provide a user with a mechanism for generating and executing a workflow when performing a commissioning process for one or more components of a system. The main objective of commissioning is to effect the safe and orderly handover of a project (e.g., building) from the constructor to the owner, guaranteeing its operability in terms of performance, reliability, safety and information traceability. Additionally, when executed in a planned and effective way, commissioning normally represents an essential factor for the fulfillment of schedule, costs, safety and quality requirements of the project.

As such, during the commissioning process, it is important to have a defined workflow so as to ensure that the commissioning process is carried out in an orderly and efficient fashion, which may ultimately save time and money, as well as reduce risk of injury when testing certain systems or equipment. For example, during the commissioning process of a new building, a commissioning coordinator may want to ensure that certain criteria are met, in a particular order, before a subsequent commissioning test is performed. This is particularly important when performing a commissioning process on systems that may pose an inherent risk of injury or death.

For example, in the case of the testing electrical equipment, the commissioning coordinator wants to ensure that personnel do not attempt to run a functional test on a piece of electrical equipment unless such equipment has first successfully passed an Electrical Safety Inspection. Otherwise, personnel may be exposed to risk of electrocution. Furthermore, a commissioning coordinator may also wish to enforce specific conditions before declaring that certain milestones have been met during the commissioning process. For example, prior to declaring a Clean Room "Room Ready", any and all operational issues identified during the commissioning tests have to be resolved.

The commissioning module of the field management system, which may be implemented on each mobile device and/or the server and/or cloud-based service, includes a workflow management module configured to generate and execute a process-driven workflow list based on user input. The workflow management module is configured to enable a user to customize the commissioning process by way of user-generated workflow list. In particular, the workflow management module is configured to enable a user to map one or more steps/tests to a specific component of a system (e.g., component of a piece of electrical equipment). The workflow management module is further configured to enable a user to assign dependencies for one or more of the mapped steps, including start criteria, which define which steps must be successfully completed before a subsequent step may begin, and completion criteria, which define what type of issues must be completely resolved before a certain step (or milestone) may be completed.

The systems and methods consistent with the present disclosure provide an intuitive mechanism of implementing a process-driven workflow during a commissioning process. The system enables generation of a user-defined process-driven workflow, which includes user-assigned dependencies. A workflow generated with systems and methods consistent with the present disclosure will generally ensure that the commissioning process is carried out in an orderly and efficient fashion, ensuring that certain criteria are met, in a particular order, before a subsequent commissioning step is performed, which will save time and money, as well as reduce the risk of injury when testing certain systems or equipment.

Turning to FIG. 1, one embodiment of an exemplary system for providing field management services is generally illustrated. FIG. 1 presents an exemplary environment diagram 10 of various hardware components and other features in accordance with an aspect of the present invention. As shown, in an aspect of the present invention, data and other information and services are, for example, input by one or more users 12 (shown as users 12*a*-12*n*) and received by one or more associated mobile devices 14 (shown as mobile devices 14*a*-14*n*). The mobile devices 14 are configured to be communicatively coupled to an external device, system or server 18 and/or cloud-based service 20 via a network 16. In addition, or alternatively, the mobile devices 14 are configured to be communicatively coupled to one another via the network 16.

The mobile devices 14 may be embodied as any type of device for communicating with one or more remote devices/systems/servers and for performing the other functions described herein. For example, the mobile device 14 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, and/or any other computing device configured to store and access data, and/or to execute software and related applications consistent with the present disclosure.

In one aspect, mobile device 14 is a one of many commercially-available tablet PCs, notebook PCs, or convertible notebook PCs. Any of a wide range of mobile device may be used. As just a few examples, the mobile device may be an Android, iOS, or WP based smartphone; an Android or iOS based tablet computer, or any other portable device. The mobile device may be suitable for a construction jobsite where shock, extreme heat, cold, direct sunlight, dust, and rain are expected. Rugged, semi-rugged, and non-rugged tablet PCs—such as the Panasonic Toughbook, the Itronix GoBook, the Motion-Computing F5 and the Xplore Technologies iX104C2—typically offer the ability to enter data using an electronic pen, built-in software keyboard, regular external keyboard, mouse and voice dictation, and may be equipped with a digital camera. Such tablet PCs typically include the ability to program pen-activated shortcuts for complex information entry as in, for example, filling out an electronic form or report. Accordingly, systems and methods described herein, particularly the online platform web-application, are compatible with mobile operating systems (OS) for PC-based mobile devices, including, but not limited to, Android, Windows, and Blackberry. In one embodiment, the mobile device 14 may include a Windows Tablet running Windows 8 OS.

In other embodiments, the mobile device 14 is computer tablet having touchscreen capabilities. As one example, the mobile device 14 may be an Apple IPAD® device, or an Android based device. Accordingly, the systems and methods described herein may execute on and may be configured to be compatible with Apple operating systems (OS), including iOS 7, 8, as well as prior and later versions, Windows OSs, Android OS, or any other OSs.

It should be understood that the term "data" means any information used in an aspect. Examples include, but are not limited to, input data by users, task data, checklist data, punch list data, standard templates or other standard information, standard report elements, data records, alerts and messages, system overhead information or other internal communications, etc.

The external computing device/system/server 18 may be embodied as any type of device, system or server for communicating with the mobile devices 14 and/or the cloud-based service 20, and for performing the other functions described herein. Example embodiments of the external computing device/system/server 18 may be identical to those just described with respect to the mobile device 14 and/or may be embodied as a conventional server, e.g., web server or the like.

The network 16 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 14, between the mobile devices 14 and the external computing device/system/server 18 and/or cloud-based service 20, may be, in whole or in part, a wired connection.

The network 16 may be any network that carries data. Non-limiting examples of suitable networks that may be used as network 16 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), other networks capable of carrying data, and combinations thereof. In some embodiments, network 16 is chosen from the internet, at least one wireless network, at least one cellular telephone network, and combinations thereof. As such, the network 16 may include any number of additional devices, such as additional computers, routers, and switches, to facilitate communications. In some embodiments, the network 16 may be or include a single network, and in other embodiments the network 16 may be or include a collection of networks.

Figure 2:
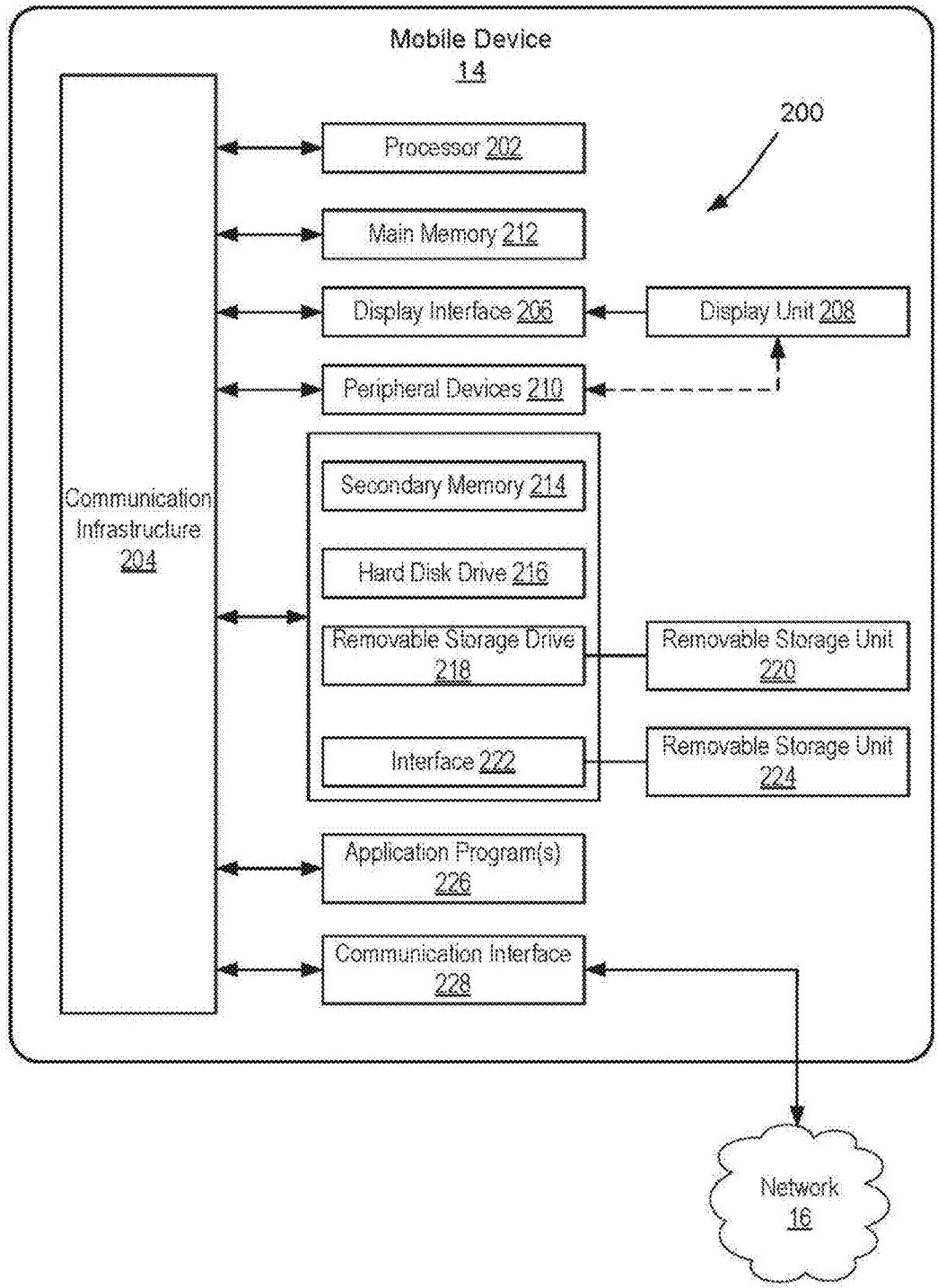
FIG. 2 is a block diagram illustrating at least one embodiment of a mobile device of the system of FIG. 1 consistent with the present disclosure.

As described in greater detail herein, a computing system (see FIG. 2) may be configured to carry out the functionality described herein (e.g., field management services and facilitation of software for carrying out one or more functions related to construction field management). In one embodiment, the invention is directed toward one or more computing systems capable of carrying out the functionality described herein. An example of a computer system 200 is shown in FIG. 2. The computing system 200 of FIG. 2 may be included within the mobile device 14, for example. Additionally, or alternatively, the computing system 200 may be included within the external computing device/system/server 18 and/or cloud-based service 20. The computing system 200 includes one or more processors, such as processor 202. Processor 202 is operably connected to communication infrastructure 204 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

The computing system 200 may include display interface 206 that forwards graphics, text, and other data from communication infrastructure 204 (or from a frame buffer not shown) for display on display unit 208. The computing system further includes input devices or peripheral devices 210. The peripheral devices 210 may include one or more devices for interacting with the mobile device 14, such as a keypad, microphone, camera, one or more audio speakers, and other sensors. In one embodiment, the display unit 208 may include a touch-sensitive display (also known as "touch screens" or "touchscreens"), in addition to, or as an alternative to, physical push-button keyboard or the like. The peripheral devices 210 may be external or internal to the mobile device 14. The touch screen may generally display graphics and text, as well as provides a user interface (e.g., but not limited to a graphical user interface (GUI)) through which a user may interact with the mobile device 14, such as accessing and interacting with applications executed on the device 14.

The computing system 200 also includes main memory 212, such as random access memory (RAM), and may also include secondary memory 214. The main memory 212 and secondary memory 214 may be embodied as any type of device or devices configured for short-term or long-term storage of data such as, for example, memory devices and circuits, memory cards, hard disk drives, solid-state drives, or other data storage devices. In the illustrative embodiment, the mobile device 14 may maintain one or more application programs, databases, media and/or other information in the main and/or secondary memory 212, 214. The secondary memory 214 may include, for example, a hard disk drive 216 and/or removable storage drive 218, representing a floppy disk drive, a magnetic tape drive, an optical disk drive, etc. Removable storage drive 218 reads from and/or writes to removable storage unit 220 in any known manner. The removable storage unit 220 may represents a floppy disk, magnetic tape, optical disk, etc. which is read by and written to by removable storage drive 218. As will be appreciated, removable storage unit 220 includes a computer usable storage medium having stored therein computer software and/or data.

In alternative embodiments, the secondary memory 214 may include other similar devices for enabling computer programs or other instructions to be loaded into the computing system 200. Such devices may include, for example, a removable storage unit 224 and interface 222. Examples of such may include a program cartridge and cartridge interface (such as that found in video game devices), a removable memory chip (such as an erasable programmable read only memory (EPROM), or programmable read only memory (PROM)) and associated socket, and other removable storage units 224 and interfaces 222, which enable software and data to be transferred from removable storage unit 224 to the computing system 200.

The computing system 200 may also include one or more application programs 226 directly stored thereon. The application program(s) 226 may include any number of different software application programs, each configured to execute a specific task related to field management. For example, the application program 226 may include construction field management software for providing field management services and facilitating an online platform web-application for carrying out one or more functions related to construction field management.

As described in greater detail herein, in one embodiment, the application program 226 may include building information modeling (BIM) software configured to render BIM models for display on the display unit 208 and further enable user interaction with the rendered BIM models. The BIM software of the present disclosure may be compatible with other existing BIM programs or software (e.g., AUTODESK® NAVISWORKS® software). Accordingly, the BIM software of the present disclosure is configured to receive and convert existing BIM data (e.g., pre-created three-dimensional (3D) BIM models) from other BIM programs and further render the received BIM data into an interactive BIM model on the mobile device 14, such that users in the field may view, manipulate, and work directly with a BIM model in the field. The BIM software consistent with the present disclosure, as well as systems and components associated therewith, including a BIM module (shown in FIGS. 3 and 5-6), are described in greater detail herein.

The computing system 200 may also include a communications interface 228. The communications interface 228 is configured to enable data to be transferred between the computing system 200 and external devices (other mobile devices 14, external computing device/system/server 18, cloud-based service 20). Examples of communications interface 228 may include a modem, a network interface (such as an Ethernet card), a communications port, a Personal Computer Memory Card International Association (PCMCIA) slot and card, etc.

Computer programs (also referred to as computer control logic) may be stored in main memory 212 and/or secondary memory 214 or a local database on the mobile device 14. Computer programs may also be received via communications interface 228. Such computer programs, when executed, enable the computing system 200 to perform the features of the present invention, as discussed herein. In particular, the computer programs, including application programs 226, when executed, enable processor 202 to perform the features of the present invention. Accordingly, such computer programs represent controllers of computer system 200.

In one embodiment where the invention is implemented using software, the software may be stored in a computer program product and loaded into the computing system 200 using removable storage drive 218, hard drive 216 or communications interface 228. The control logic (software), when executed by processor 202, causes processor 202 to perform the functions of the invention as described herein.

In another embodiment, the invention is implemented primarily or entirely in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 3:
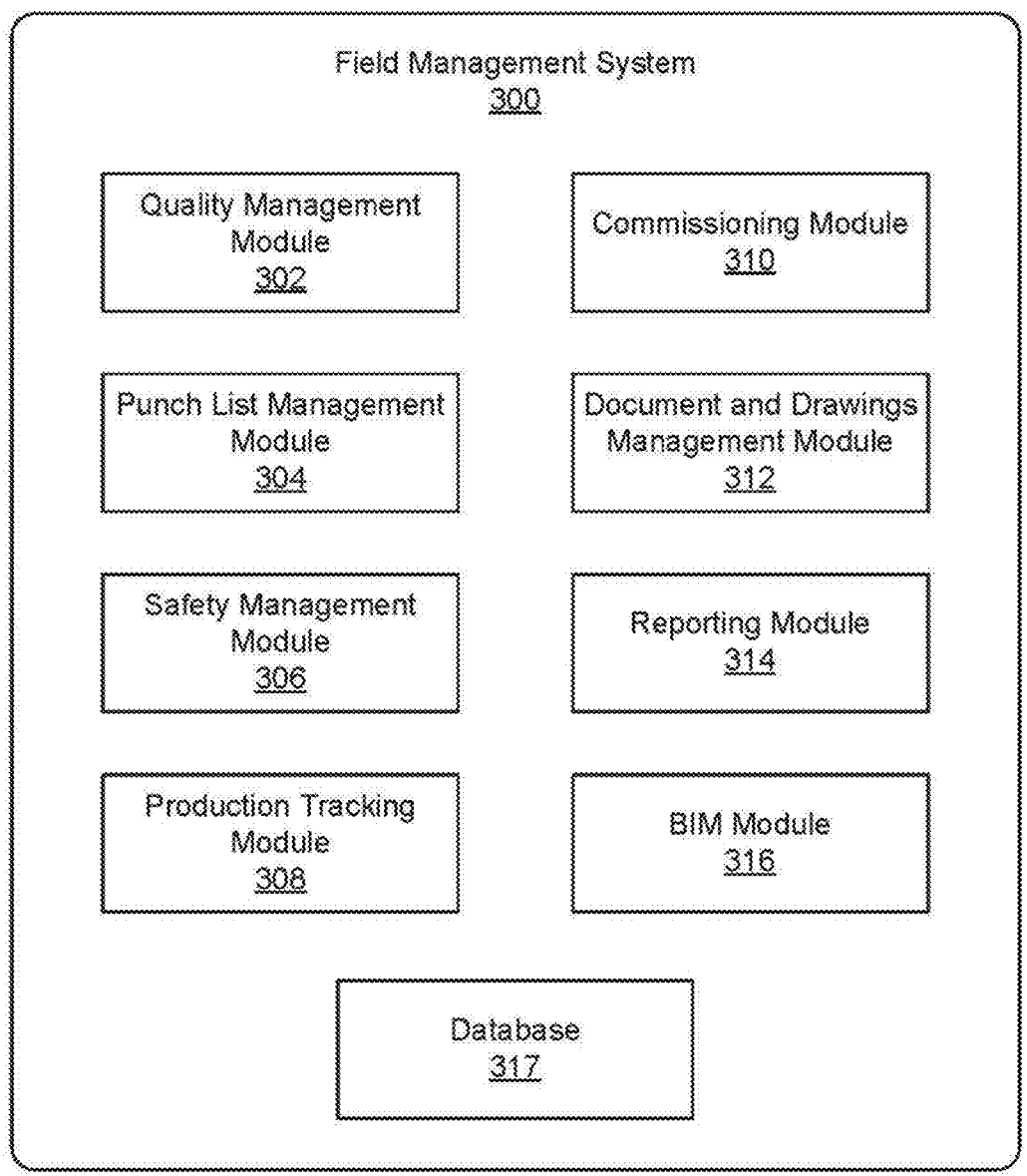
FIG. 3 is a block diagram illustrating an exemplary embodiment of a field management system for providing mobile-based field management services and communication between the mobile devices and the external computing device/system/server and/or the cloud-based service of FIG. 1.

Referring to FIG. 3, an exemplary embodiment of a field management system 300 is generally illustrated. The field management system 300 is configured to generally provide one or more field management services, including, but not limited to, issue tracking, field reporting, materials tracking, safety, quality assurance (QA) and quality control (QC), work list, commissioning, punch list, production tracking, and document and drawings management. Accordingly, the field management system 300 may include a quality management module 302, punch list management module 304, safety management module 306, production tracking module 308, commissioning module 310, document and drawings management module 312, reporting module 314, and building information modeling (BIM) module 316. Each of the modules 302-316 is configured to provide users, when executing the software application, access to and exchange of field data in conjunction with the desired process. The field management system 300 further includes a database 317 for storing resources related to each of the field management services. The resources may include, but are not limited to, checklists, checkboxes, descriptions, data items, information templates, equipment lists, report templates, histories, images, etc.

The field management system 300 is generally configured to communicate and operate in conjunction with the computing system 200 of FIG. 2. Accordingly, in some embodiments, the field management system 300 is incorporated within the mobile devices 14. Additionally, or alternatively, the field management system 300 may be part of the external device, system or server 18 and/or cloud-based service 20.

Figure 4:
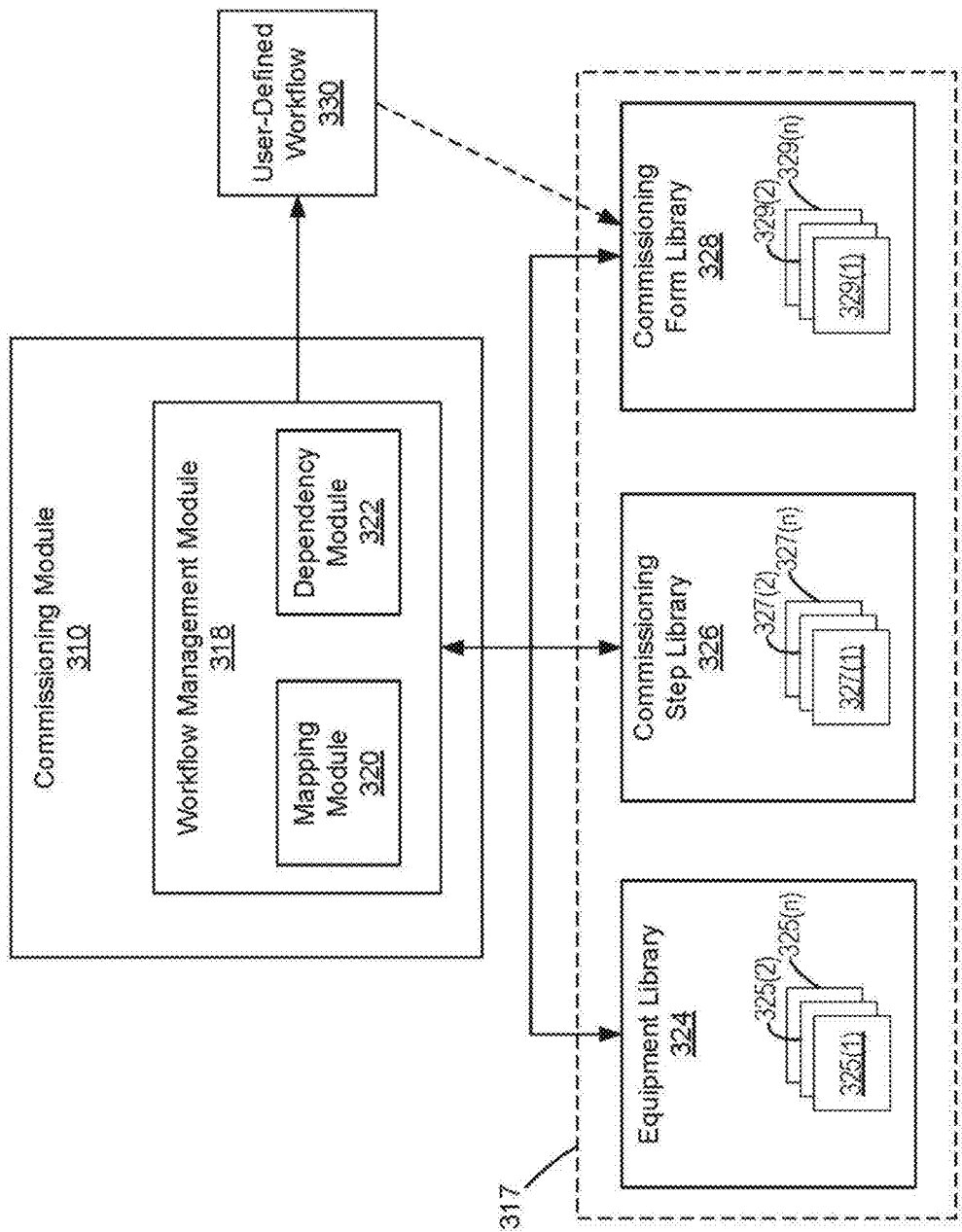
FIG. 4 is a block diagram illustrating a portion of the field management system of FIG. 3 in greater detail.

FIG. 4 is a block diagram illustrating the commissioning module 310 of the field management system 300 of FIG. 3 in greater detail. As shown, the commissioning module 310 includes a workflow management module 318 configured to generate a user-defined process-driven workflow 330 based on input from a user 12, generally in control of and/or having responsibility for overseeing and managing one or more field management services. For example, systems and methods consistent with the present disclosure may enable a commissioning coordinator to create a specific workflow of any particular component of a system, such as an electrical system within a newly construction building. The workflow management module 318 is generally configured to enable the coordinator to set up the commissioning process, specifically the workflow of the commissioning process. Generation of a user-defined workflow 330 is generally performed on the server side of the system, wherein the user-defined workflow 330, once created, may then be synchronized with one or more of the mobile devices 14, thereby enabling the enforcement of the user-defined workflow 330 for a specific component or system on the mobile devices 14.

In the illustrated embodiment, the workflow management module 318 includes a mapping module 320 and a dependency module 322. As described in greater detail herein, the mapping module 320 is configured to enable the coordinator to map a specific component (e.g. piece of equipment) of a system to undergo the commissioning process with a specific step (e.g., functional test), in a particular order, so as to generally create a workflow that dictates progression of the commissioning process as a whole. The dependency module 322 generally enables the coordinator to optionally define dependencies between steps. The dependencies may include, for example, start criteria, which defines which steps must be successfully completed before a subsequent step may begin, and completion criteria, which defines what type of issues must be completely resolved before a certain step (or milestone) may be completed. Accordingly, during the commissioning process of electrical equipment, for example, the user-defined process-driven workflow may ensure that that personnel do not attempt to run a functional test on a piece of electrical equipment unless such equipment has first successfully passed an Electrical Safety Inspection, as dictated by the dependencies assigned to the specific step, as described above. Upon mapping steps to components and generating step/component pairs and optionally further assigning dependencies for the steps, the workflow management module 318 generates a user-defined process-driven workflow 330 to generally dictate the process of the commissioning process.

As shown in FIG. 4, a commissioning coordinator may access one or more libraries containing data stored in the database 317, for example, for use in creating a user-defined workflow for any given commissioning process. In particular, the coordinator may have access to a plurality of equipment profiles 325(1)-325(n) stored in an equipment library 324, a plurality of steps 327(1)-327(n) stored in a commissioning step library 326, and a plurality of interactive commissioning forms 329(1)-329(n) stored in a commissioning form library 328. Generally, the coordinator may first define a series of commissioning steps (e.g. tests) for any particular commissioning process. Accordingly, the coordinator utilizes one or more steps 327 from the commissioning step library 326 for any particular system to be commissioned, including the individual components of such system. At this point, the coordinator may also define dependencies between the steps, such as start criteria and/or completion criteria.

The coordinator may then access and design one or more interactive commissioning forms 329 from library 328. The interactive forms 329 are used to capture the results of each commissioning step in a workflow on the mobile device 14. The interactive form 329 may include, for example, a GUI (Graphical User Interface) presented on a display of a mobile device 14 and mimic a paper document generally used in the commissioning process. However, the interactive form 329 enables input by way of touchscreen and further provides functions not otherwise available on a paper document (e.g., filter and sorting, task data, image presentation, real-time updating, etc.). As an example, a user conducting a Functional Test on an electrical piece of equipment will record the results on an Electrical Test form and an individual conducting a Functional Test (step) on a mechanical piece of equipment will record results on a Mechanical Test form. These two forms are created in as interactive forms so they may be filled out electronically on the mobile device 14.

The coordinator may further access a plurality of components 325 from the equipment library 324. In one embodiment, the system may be configured to enable the coordinator to define an hierarchal equipment structure, or tree, related to a systems that require commissioning. For example, the coordinator may define a hierarchal equipment tree representing rooms> systems within the rooms> components which make up the systems (i.e., that require commissioning). For each entry in the equipment tree, the coordinator may define which steps 327 in the commissioning process must be completed. In particular, the mapping module 320 is configured to assign one or more steps 327 to a particular component 325, thereby creating step(s)/component pairings. For instance, a Clean Room may go through only Construction Complete and Room Ready but an individual component may require Design Verification, Construction Complete, Electrical Safety Inspection, Functional Test, and Emergency Test. Furthermore, for each step(s)/component pairing, the mapping module 320 is further configured to enable the coordinator to define a form 329 to be used on the particular component 325.

In some instances, the equipment library 324 may include a large amount of data (e.g., thousands of pieces of equipment 325) from which the coordinator may choose. Likewise, the coordinator may have a large number of steps 327 to choose from and assign with each piece of equipment 325. Accordingly, generation of a user-defined workflow 330 may be quite extensive, as systems and methods consistent with the present disclosure are configured to handle large amounts of data, including the large number of different variations for generating a user-defined workflow 330. Accordingly, to simplify the setup, systems and methods consistent with the present disclosure provide the ability to setup templates for different types of equipment that may be setup once and then applied to multiple items in the equipment tree. For example, a coordinator may set up a particular workflow template any given piece of equipment. The workflow template may include specific steps, optionally including dependencies between one or more of the steps, and the particular interactive form to be used. For example, a coordinator may set up a template for Air Handling Units (AHUs) that define what steps must be conducted on an AHU and further define what forms must be used for each step. The template may be saved (e.g., stored in the database 317) and may be applied to AHU1-AHU100 (assuming there are a hundred AHUs in the building) in future commissioning processes when needed. Thus, a coordinator need not create a new workflow each time.

Figure 5:
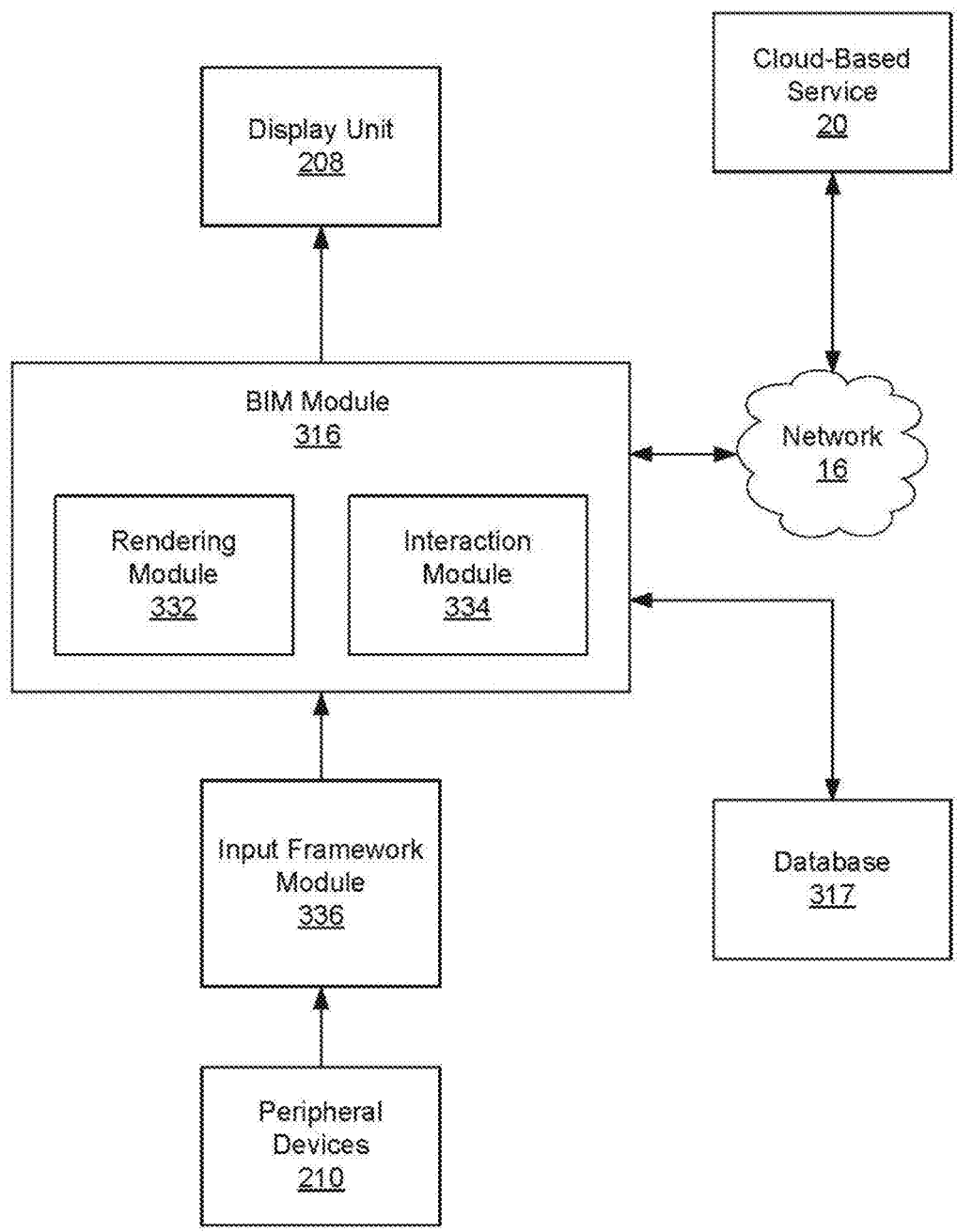
FIG. 5 is a block diagram illustrating another portion of the field management system of FIG. 3.

FIG. 5 is a block diagram illustrating the BIM module 316 of the field management system 300 of FIG. 3 in greater detail. As previously described, in some instances, a user in the field may need to access a model of the project being constructed throughout the life cycle of the construction process. For example, in some instances, a worker may need to review the plans during construction so as to ensure that the task with which they are responsible (e.g., electrician installing electrical components) is being carried out as planned in accordance with the building model. However, it should be noted that the BIM systems and methods of the present disclosure may be used concurrently and in conjunction with other field management services, such as the commissioning process, as previously described herein, or the quality control process, so as to ensure the project is being, or has been, completed according to plans and as intended and to address any safety issues. As such, the BIM module 316 may carry out processes with any one of the other modules 302-314 shown in FIG. 5.

The BIM module 316 is configured to manage the rendering of and interaction with BIM models on a mobile device in the field. In the example shown in FIG. 5, the BIM module 310 includes a rendering module 332 and an interaction module 334. The rendering module 332 is configured to receive BIM data, such as a BIM file, and further render a BIM model from such data. The rendering module 332 may include custom, proprietary, known and/or after-developed data and graphics code (or instruction sets, functions, etc.) that are generally well-defined and operable to receive BIM data and generate an interactive 3D graphical model for output to a display 208. For example, the rendering module 332 may include a graphics processing unit (GPU) or similar hardware.

The BIM data may be in the form of a BIM file stored locally on the mobile device 14 (e.g., stored in database 317) and compatible with the current operating system (OS) and/or project management software running on the mobile device 14. It should also be noted that the rendering module 332 is configured to receive BIM data (e.g., created 3D BIM model) from an existing BIM design program, for example. Alternatively or in addition, the BIM data may be received over the network 16. The BIM data may include information about physical components in a construction project, such as a building, equipment, and/or physical systems. The BIM data may include a BIM model, which represents the physical components by, for example, including 3D geometry of the physical components. Alternatively or in addition, the BIM data may include associated data, including, for example, viewpoints for navigating the model, a list of equipment included within the model, and/or properties for each piece of equipment. The rendering module 332 may include, for example, an extraction/transformation module 333 configured to receive, process, and transform the BIM data into a format that is compatible with project management systems consistent with the present disclosure. Accordingly, the BIM module 316 may be compatible with other existing BIM design programs and solutions and is, therefore, not limited by the type of BIM data that may be received and rendered. The rendering module 332 is further configured to provide a visual rendering of a 3D BIM model of the transformed BIM data on the display of the mobile device. Additionally, or alternatively, the BIM module 316 may be configured to receive BIM data and files from the cloud-based service 20, for example.

The BIM model includes a variety of different components or elements associated with the construction project that, when placed in relation to one another, form the 3D BIM model as a whole. For example, the different elements may include, substructure, foundation, walls (exterior and interior), floors, equipment, furnishings, as well as systems or assemblies within the building or building site, which may include fire suppression, plumbing, heating, ventilation, and air-conditioning (HVAC), electrical, and communications.

Upon generating a 3D BIM model from BIM data, the rendering module 332 is configured to output the model to the display unit 208 of the mobile device 14 to further enable user interaction with the 3D model and the various elements of the model. The interaction module 334 is configured to enable a user 12 of the mobile device 14 manipulate and work directly with the displayed 3D BIM model by way of user input. The user input may be in the form of user commands received from the one or more peripheral devices 210 (e.g., touch-based input on the display, keypad/board commands, image data, audio data, etc.). The peripheral devices 210 may, in turn, provide user input to an input framework module 336. The input framework module 336 may include custom, proprietary, known and/or after-developed code (or instruction sets) that are generally well-defined and operable to receive the user input and further determine the type of input (e.g., touch input, image, audio, etc.). The interaction module 334 is configure to receive user input from one or more of the peripheral devices 210 via the input framework module 336 and further identify user commands associated with the user input for the manipulation of the displayed 3D BIM model.

Figure 6:
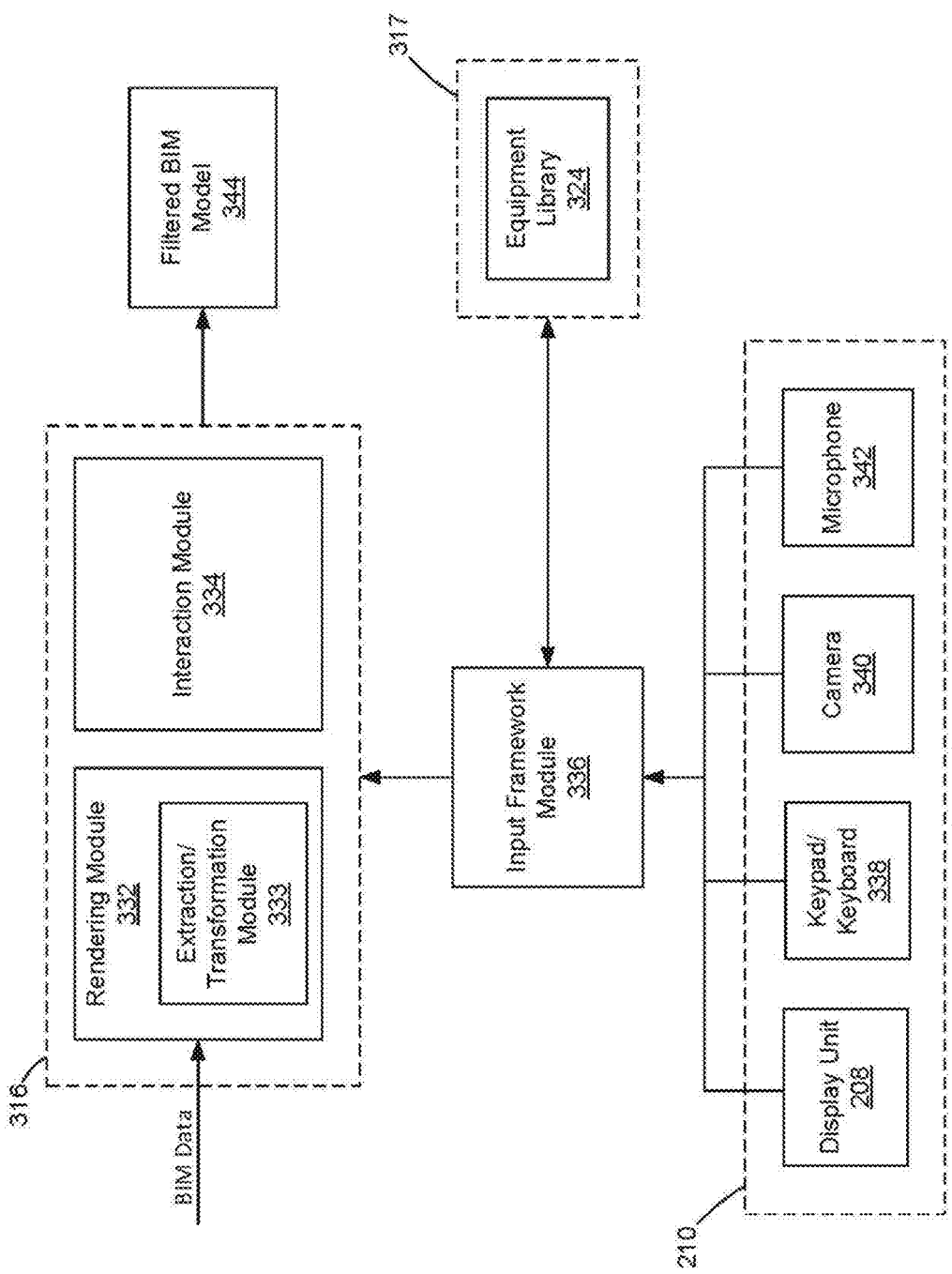
FIG. 6 is a block diagram illustrating the building information model module of FIG. 5 in greater detail.

For example, as shown in FIG. 6, the interaction module 334 is configured to receive user input from one or more input devices or peripheral devices 210, such as, for example, a touch-screen display 208, a keypad/keyboard 338, a camera 340, and/or a microphone 342. In response to user input, the interaction module 334 is configured to enable a user to interact and work directly with the displayed 3D BIM model and associated informational data. The informational data may include information related to the building, including geometry, spatial relationships, geographic information, quantities and properties of building components, equipment information, and detailed layouts and dimensions of the building.

In one embodiment, the display unit 208 may be a touchscreen display, such that a user 12 may interact with the displayed 3D BIM model via the display 208, which may include a graphical user interface (GUI) including one or more tools for manipulating viewpoints of the 3D BIM model. The interaction module 334 may be configured to identify one or more touch events based on received touch input from the input framework module 336. For example, the interaction module 334 may be configured to identify the touch type and/or touch location(s) on the touch-sensitive display 208. Touch type may include a single tap, a double tap, a tap and hold, a tap and move, a pinch and stretch, a swipe, etc., to the touch-sensitive display 208. Touch location(s) may include a touch start location, a touch end location and/or intermediate moving touch locations, etc., of the touch-sensitive display 208. The touch locations may correspond to coordinates of touch-sensitive display 208. Accordingly, the interaction module 334 may include custom, proprietary, known and/or after-developed touch detection code (or instruction sets) that are generally well-defined and operable to receive touch data and to identify a touch event.

In turn, the rendering module 332 may be configured to reconfigure one or more parameters of the 3D BIM model in response to the user input. For example, the BIM data originally received and converted by the rendering module 332 may include predefined viewpoints for the BIM model. Accordingly, a user may select from one of the predefined views of the BIM model. Additionally, or alternatively, a user may be enabled to manipulate one or more elements of the BIM model on the fly, such as the type of view (e.g., bird's eye, side, sectional, magnified, etc.), hide or show specific layers (e.g., floors, walls, interior versus exterior, etc.) as well as the different elements (e.g., equipment, furnishings, plumbing, heating, ventilation, and air-conditioning (HVAC), electrical, communications, etc.).

Figure 7:
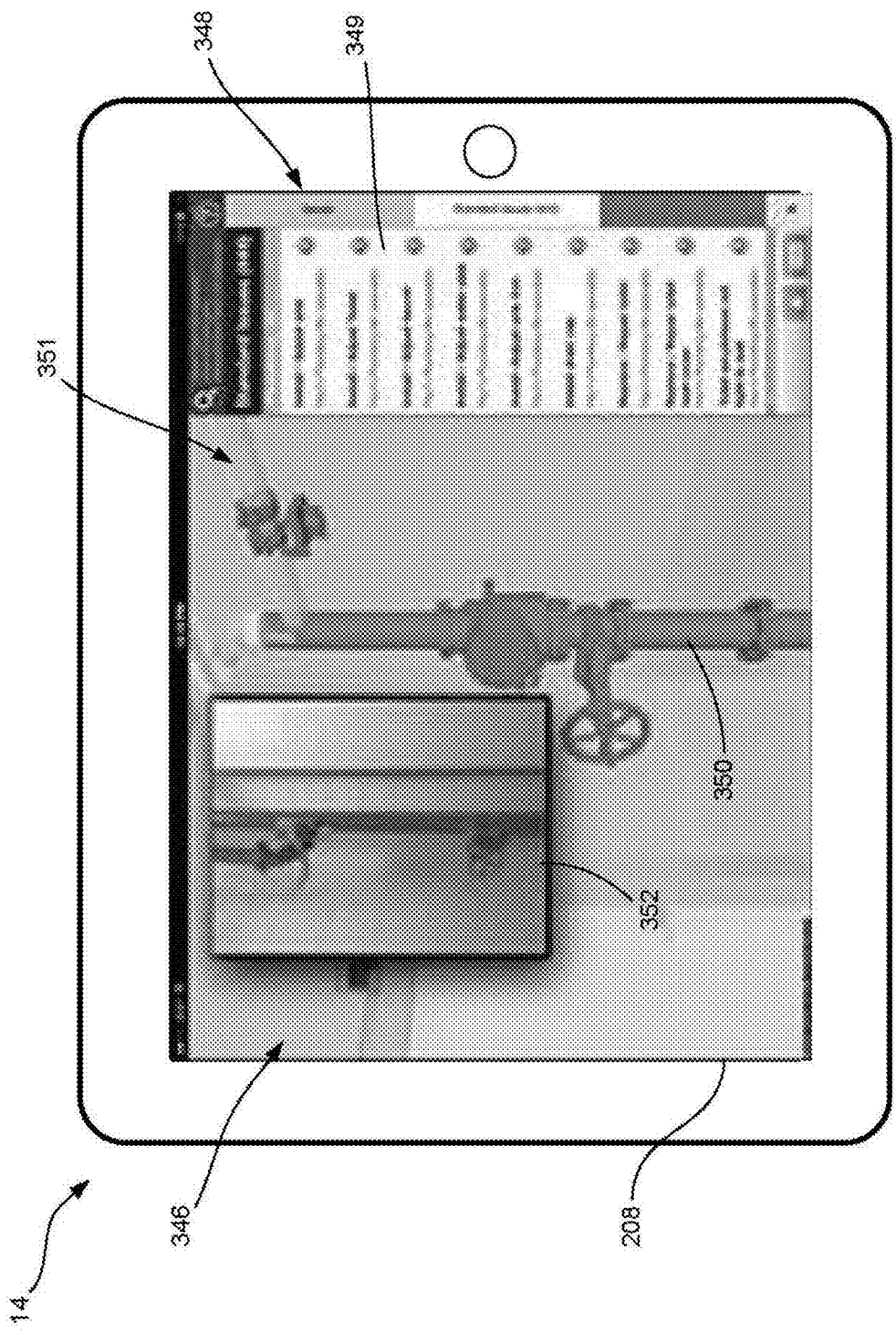
FIG. 7 illustrates the presentation of an interactive BIM model on a touchscreen display of a mobile device consistent with the present disclosure.

FIG. 7 illustrates the presentation of an interactive BIM model on a touchscreen display 208 of the mobile device 14 consistent with the present disclosure. As shown, the BIM model may be manipulated by the user via the graphical user interface (GUI) 346, which may provide a variety of tools or options 348 from which the user may select. In one embodiment, the GUI 346 may visually provide the user with a list 349 of the different elements related to the construction project (e.g., building) of the 3D BIM model. The user may navigate the BIM model by way of selection from the lists. Accordingly, the view of the BIM model (as displayed) may change in accordance with user selection of different elements. For example, the GUI 346 may provide lists related to structural elements of the building (e.g., floors, walls, etc.), the specific rooms within the building, systems installed in the building, as well as an inventory list of equipment included (or to be included) within the building. The lists 349 may be in the form of dropdown menus, for example.

Upon selecting one or more elements from the related list, the selected elements may in turn be visually highlighted in the BIM model. In other words, a selected physical component may be displayed differently than other physical components of the BIM model that are displayed with the selected physical component. For example, a user may wish to call attention to a particular piece of electrical equipment. Accordingly, the user need only select the desired piece of equipment from the inventory equipment list, and, in turn, the selected piece of equipment will be shown more clearly (e.g., highlighted) in the BIM model. For example, the selected piece of equipment may have an enhanced contrast in relation to surrounding elements or the surrounding elements may become temporarily translucent to cause the selected piece of equipment to stand out. As shown in FIG. 7, the user may select a piece of plumbing equipment, such as a pipe 350, from an inventory equipment list 349. In turn, the selected pipe 350 will be shown more clearly (e.g., highlighted) in the BIM model, while the remaining elements in the BIM are more translucent, as indicated by arrow 351. Other components related to the selected piece of equipment, such as components included as part of the overall system to which the selected piece of equipment belongs, may also be highlighted. For example, upon selecting the pipe 350, additional plumbing fixture may also be highlighted.

Additionally, or alternatively, the user may select the desired item or geometry by directly touching the item or geometry in the displayed model. Furthermore, a user may find and subsequently highlight an item, such as a piece of equipment, in the BIM model by utilizing the camera 340 to scan a barcode of a physical piece of equipment (as opposed to virtual), wherein the interaction module 334 is configured to receive the scanned item data and further relay the input to the rendering module 332 to highlight the scanned item in the BIM model. The mobile device 14 may be configured to utilize any known barcode scanning software, such as, for example, the RedLaser SDK.

In addition to enabling a user to visually highlight the selected piece of equipment, systems of the present invention further provide a user with the ability to navigate a parent system to which the selected piece of equipment belongs. For example, upon receiving user input associated with the selection of an element, the interaction module 334 is configured to identify a parent system to which the selected element belongs, upon which the rendering module 332 is configured to visually highlight the identified parent system in BIM model on display. For example, in the event that the user selects the pipe 350, the interaction module 334 is configured to identify the parent system to which the pipe 350 belongs, such as, for example, all plumbing lines and fixtures related to the selected pipe 350. The GUI may further provide the user with a command that, upon selection, provides a highlighted view of the parent system in the BIM model on display and may further enable the user to navigate through the different components of the parent system based on a defined tree structure (e.g., in any defined pattern). Another example may include selection of a piece of electrical equipment, such as an electrical outlet. The interaction module 334 is configured to identify the parent system to which the electrical outlet belongs, such as, for example, all electrical lines and other outlets related to the selected outlet and sharing the same breaker.

The GUI may further provide additional information related to the selected piece of equipment and/or parent system, such as a list of proprieties or attributes associated with the selected piece of equipment or system highlighted in the model. The list or properties or attributes may include, but are not limited to, equipment/system specifications and/or dimensions, manufacturer, date of manufacture, dates of install and/or service, and installation provider, to name a few. The data associated with the properties or attributes may be part of the originally received BIM data file.

As such, the rendering and interaction modules 332, 334 enable a user 12 of the device 14 to effectively filter the BIM model so as to highlight a portion of interest in the BIM model and further obtain properties associated with the highlighted portion of interest. Upon manipulating the 3D BIM model to their liking and generating a filtered BIM model 344, the user 12 may take a two-dimensional (2D) "snap shot", similar to a screen capture of the filtered BIM model 344 utilizing the camera 340. The interaction module 334 is further configured to enable a user to include user input data to the snapshot of the filtered BIM model 344, such as annotations, so as to alert others of an issue or concern, as well as any changes or revisions that may be required. The annotations may include specific notes and/or images (e.g., captured by the camera 340) and/or voice recordings (e.g., captured by the microphone 342) which may provide details regarding the portion of interest and may further indicate areas of concern or issues that require attention and/or correction.

The snapshot may include metadata related to the filtered BIM model, including, but not limited to, model rotation, hidden and shown layers, and/or selected items. The metadata will subsequently enable the user to alternate between the 2D, marked-up, snapshot and the same view without mark-ups, in the BIM model, thereby enabling users to get the best of marked-up 2D snapshots and the interactive 3D model. The user 12 may then transmit snapshots of the filtered BIM model 344 to at least one of the local storage 317 and cloud-based service 20. By saving snapshots to the cloud-based service 20, other distributed users of the system are able to access the snapshots and see the filtered BIM model(s) 344. Accordingly, every distributed team member may use the same reference model to coordinate their work plans and from the cloud-based service, the model is synchronized to mobile devices for use by field personnel to ensure that quality criteria embedded in the model is always at their fingertip.

In one embodiment, a filtered BIM model 344, including attached annotation(s), may be used to trigger a workflow issue transaction notification, thereby notifying the appropriate party (e.g., field personnel) and making them aware of the issue or revision included and made note of, by way of the annotation(s), in the filtered BIM model 344. For example, in the event that there is an electrical issue (e.g., incorrect electrical component installed) in a particular room of a building, the filtered BIM model 344 may include a view of the building with the particular room highlighted, and further include annotation(s) providing details regarding the incorrect electrical component, as well as the correct component that needs to be installed. As shown in FIG. 7, a user may include an image 352 of a real-world configuration of the pipe 350 and other plumbing fixtures in relation thereto. The image 352 may provide a user with what the construction project actually resembles or what it should resemble, so as to ensure that the plumbing is constructed as intended. The filtered BIM model may then be included in a workflow issue transaction notification to the responsible party (e.g., plumber, electrician, carpenter, etc.). Upon receiving notification, the responsible party may retrieve and interact with the filtered BIM model and review the highlighted portion of interest and the issue that needs to be resolved or a revision that needs to be made based on the attached annotation(s). The workflow may be similar to the user-defined workflow as previously described regarding FIG. 4, such that, before a particular step of any particular construction project (e.g., system install) may be started, the issue presented in the filtered BIM model 344 must be resolved. Accordingly, the system is configured to provide timely alerts to field personnel regarding issues so as to prevent any additional work from being started until such issues are resolved.

Figure 8:
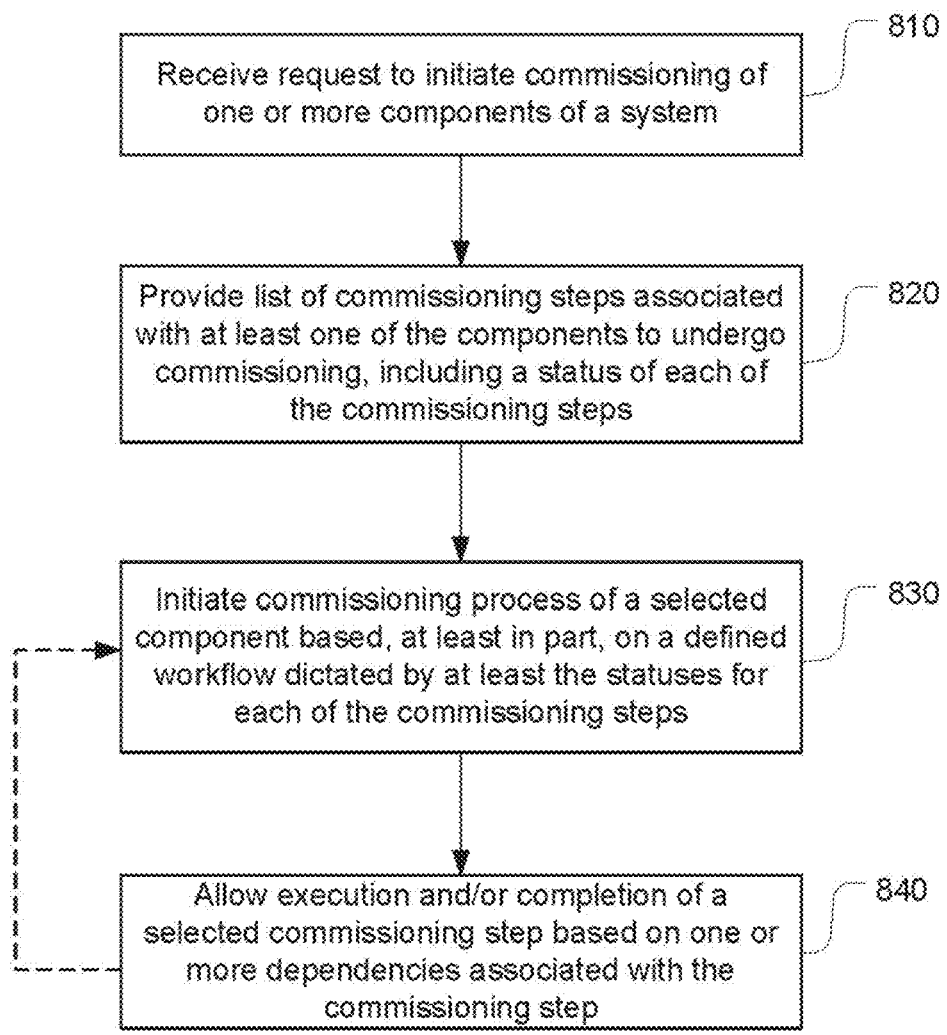
FIG. 8 is a flow diagram illustrating one embodiment of a method for executing a generated process-driven workflow for a commissioning process of one or more components of a system.

FIG. 8 is a flow diagram of a method 800 for executing a generated process-driven workflow for a commissioning process of one or more components of a system, is generally illustrated. The method 800 includes receiving request to initiate commissioning of one or more components of a system (operation 810). A user, such as field personnel, may request initiation of the commissioning via a mobile device configured to execute and run an online platform web-application for carrying out one or more functions related to construction field management, including, but not limited to, commissioning. The user may select a piece of equipment from an equipment library that requires commissioning. For example, the user may use a GUI on their mobile device to scroll and select from a list of equipment. Additionally, or alternatively, the user may scan a bar code on a particular piece of equipment, which, in turn, pulls up a corresponding equipment profile.

The method 800 further includes providing a list of commissioning steps associated with at least one of the components that the user requested to be commissioned (operation 820). Each of the steps may include a status associated therewith. For example, each step may have a status selected from not started (step has not be performed), in process (step is currently in process), passed (step has been performed and passed), and failed (step has been performed and failed). The method further includes initiating the commissioning process for a selected component based, at least in part, on the defined workflow associated with the commissioning process, as well as the status for any given commissioning step (operation 830). For example, a user may select a particular step to perform, such as a Functional Test of a piece of electrical equipment. The method further includes enabling execution and/or completion of a selected commissioning step based on one or more dependencies associated with the commissioning step (operation 840). One or more commissioning steps may include dependencies associated therewith. The dependencies may generally dictate the order with which the steps may be carried out. For example, a start criteria dependency may define which steps must be successfully completed before a subsequent step may begin and a completion criteria dependency may define what type of issues must be completely resolved before a certain step (or milestone) may be completed.

Figure 9:
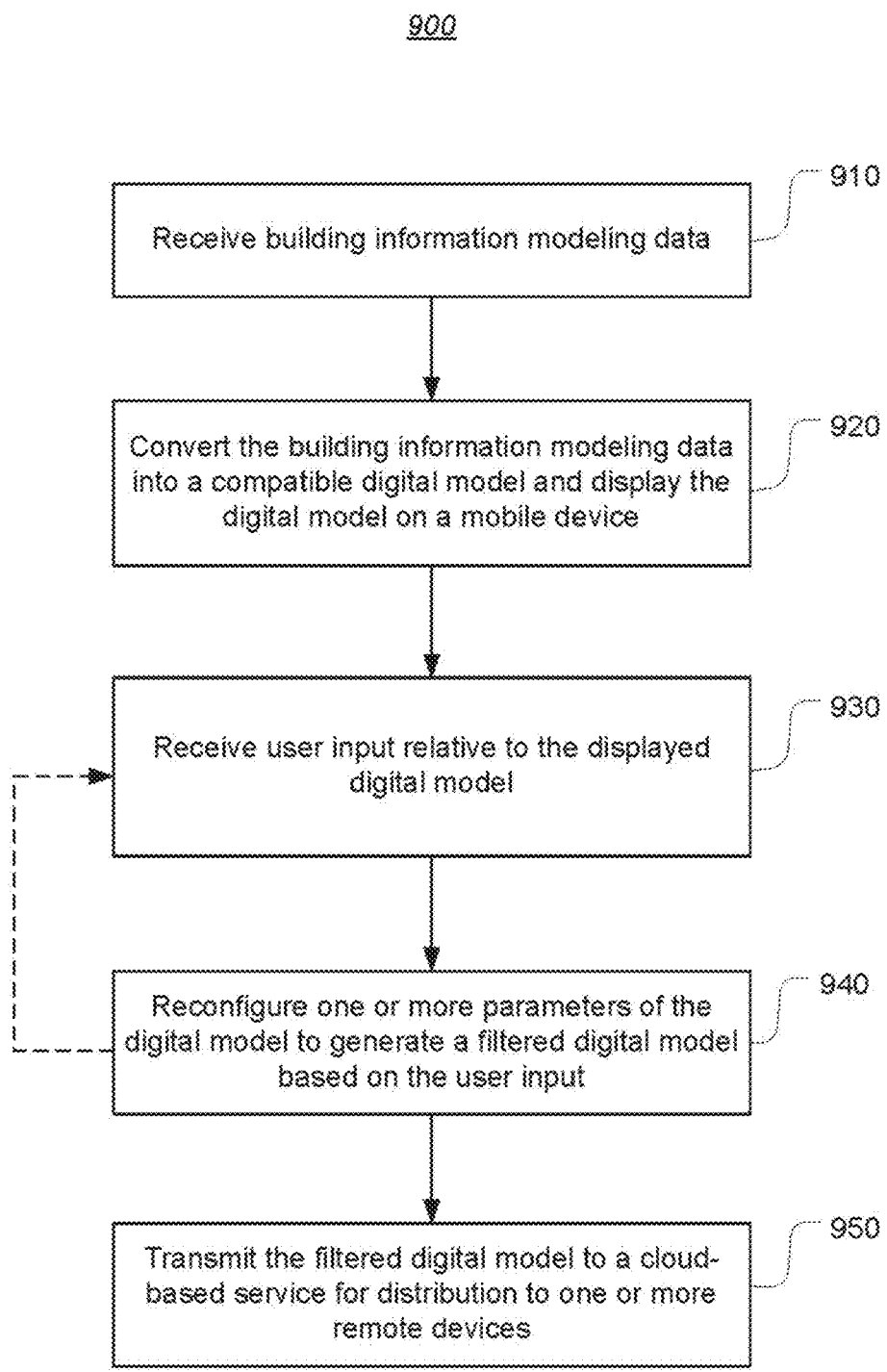
FIG. 9 is a flow diagram illustrating one embodiment of a method for displaying and manipulating a virtual model on a device.

FIG. 9 is a flow diagram of a method 900 for displaying and manipulating a virtual model on a device. The method includes receiving building information modeling data (operation 910). The building information data may include a BIM model (e.g., 3D geometry) and associated data, including, but not limited to, viewpoints for navigating the model, a list of equipment included within the model, and/or properties for each piece of equipment. The method 900 further includes converting the building information modeling data into a compatible digital model and displaying the converted digital model on a display of the device (operation 920).

In some implementations, the BIM is pre-processed prior to delivery to the mobile device. The pre-processing may include any type of adaptation to the baseline BIM to create an adapted BIM for delivery to the mobile device. The baseline BIM may be, for instance, the full complexity version of the BIM stored in the cloud server. The adaptations may be responsive to the hardware or software capabilities or configuration of the mobile device, the connection characteristics (e.g., bandwidth) of the mobile device to the system (e.g., the cloud servers) that store the BIM, the operator of the mobile device (e.g., operator authorizations or privileges with respect to specific components of the BIM), or may be responsive to any other factors.

One specific example of an adaptation is reducing complexity of the baseline model to create a reduced complexity model be delivered to the mobile device. This may be done for many reasons, such as to reduce bandwidth requirements, or reduce the time and computational expenditures for rendering and display of the model on the mobile device. The reduction in complexity of the model may be accomplished in many different ways, such as by removing specific layers from the model, removing specific objects (e.g., images, complex structural objects, or any other types of objects), reducing triangle (or other geometry) counts, compressing the model, replacing identical instances of objects with a single set of object data and adding pointers to the single set of object data for each instance, or any other reduction in complexity.

There are several technical advantages of creating and delivering the reduced complexity model. For instance, the result is a reduced BIM file size for synchronization and therefore reduced time for data synchronization. As another example, the reduced complexity BIM file is better able to render on less powerful mobile devices, and may make building geometry and imager displayed effectively on smaller displays. Further, the reduced complexity model may enhance BIM data security by allowing identified named users access only to certain permitted parts of BIM models. That is, the filtering operations may be responsive to user identifiers, so that specific users received a model that has had specific components added or removed according to which components the user is authorized to receive. For instance, a particular user may not be authorized to view the low-voltage network cable routing schematic, and the filtering may responsively remove, e.g., the network connectivity layer from the BIM model, prior to delivering the BIM model to the user's mobile device.

The converted digital model may be a compatible digital model in the sense that the converted digital model may be compatible with project management software. The digital model may generally include a 3D BIM model of a construction project, such as a building, for example. Alternatively or in addition, the digital model may include a subset of the 3D BIM model. Alternatively or in addition, the digital model may include 3D information in a format different than in the 3D BIM model. The method 900 further includes receiving user input relative to the displayed digital model (operation 930). The user input may be in the form of user interaction with the digital model by way of a user interface, such as, for example, a GUI on the display of the device, wherein the user may manipulate the digital model so as to view different portions of interest.

The method 900 further includes reconfiguring one or more parameters of the digital model to generate a filtered digital model based on the user input (operation 940). The digital model may include informational data associated with the subject matter of the model. In this example, the digital model represents a construction project of a building. The informational data may include geometry, spatial relationships, geographic information, quantities and properties of building components, equipment information, and detailed layouts and dimensions of the building. Accordingly, the user may manipulate the digital model, including certain informational data, so as to achieve a view including a portion of interest in the filtered digital model. The method 900 further includes transmitting the filtered digital model to a cloud-based service for distribution to one or more remote devices (operation 950). The filtered digital model may be stored in the cloud-based service to share with other users on their respective mobile devices, thereby enabling other distributed users to view the filtered digital models, including the portions of interest.

While FIGS. 8 and 9 illustrate method operations according various embodiments, it is to be understood that in any embodiment not all of these operations are necessary. Indeed, it is fully contemplated herein that in other embodiments of the present disclosure, the operations depicted in FIG. 8 or 9 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it may be appreciated that the logic flow merely provides an example of how the general functionality described herein may be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

In some examples, a device may be provided that includes an input device, a display device, a rendering module, an interaction module, and a communication module. The rendering module may be configured to: receive building information modeling data; convert the building information modeling data into a digital model; and cause the converted digital model to be displayed on the display device as an image of a physical component represented by the building information modeling data. The interaction module may configured to: receive user input relative to the displayed digital model from the input device, the user input indicating selection of the physical component represented by the building information modeling data; and modify a parameter of the digital model to generate a filtered digital model based on the user input, the physical component represented by the filtered digital model. The communication module may be configured to transmit the filtered digital model over a communications interface to a cloud-based service through which the filtered digital model representative of the selected physical component is shared for display by multiple devices.

The interaction module may be further configured to receive user data from the input device and associate the user data, in the filtered digital model or other data structure, with the physical component. For example, the interaction module may be configured to receive annotations related to the physical component from the input device and associate the annotations, in the filtered digital model, with the physical component. The communication module may be further configured to transmit a notification of an issue to be addressed in a workflow transaction, the notification transmitted based on the selection of the physical component and association of the annotations with the physical component. The notification may include the filtered digital model. In some examples, the interaction module is further configured to cause the filtered digital model to be displayed on the display device with the physical component displayed differently than another physical component represented by the filtered digital model.

In some examples, a method may be provided. Building information modeling data may be converted into a digital model, the digital model representing a physical component also represented in the building information modeling data. The converted digital model may be displayed on a display of a first device by rendering an image of the physical component represented in the converted digital model and the building information modeling data. User input may be received from an input device of the first device, the user input indicating a selected point of interest in the building information modeling data. A parameter of the digital model may be modified to generate a filtered digital model based on the user input, the filtered digital model capturing the selected point of interest in the building information modeling data. The selected point of interest in the building information modeling data may be shared by transmitting the filtered digital model from the first device to a cloud-based service for display of the selected point of interest on a second device.

The filtered digital model may be displayed on the display of the first device by rendering an image of a physical component included in the point of interest differently than another physical component represented by the filtered digital model. Receiving the user input may include receiving scanned item data from a bar code scanner. The scanned item data may be read from a bar code on a physical component by the bar code scanner, and may indicate that the physical component is the selected point of interest in the building information modeling data.

A list of attributes of a selected physical component included in the point of interest may be displayed. Alternatively or in addition, a rendered image of the selected physical component may be displayed.

A two-dimensional image of the point of interest may be received from a camera of the first device. The two-dimensional image may be included in, or attached to, the filtered digital model that is shared through the cloud-based service. The two-dimensional image of the point of interest and an image rendered from the filtered digital model may be alternatingly displayed on the display of the first device.

Annotations may be included on the two-dimensional image of the point of interest. The filtered digital model may indicate an issue with a piece of equipment or physical system for which a user of the second device is responsible, the point of interest including the piece of equipment or physical system.

Note that in some implementations, the model may group individual objects or groups of objects together into grouped, higher level objects. For instance, the model may group together a set of wall objects to create a room object in the BIM. The grouped objects may, for instance, exist in distinct layers of the model, and may be manipulated or modified independently of the remainder of the model. Any of the systems, including the mobile device, may then interact with the grouped objects in ways that are consistent with component objects that makeup the group. For instance, the interaction module may tag the grouped object with annotations, issue report data, or other data. These annotations may be uploaded into the cloud and associated with the model (and in particular with the grouped object itself) for future reference.

A product may be provided that includes a non-transitory machine readable medium and instructions stored on the medium for execution by an instruction processor or processor. The instructions may be executable to: receive building information modeling data; convert the building information modeling data into a digital model; cause the digital model to be displayed on a display device as an image of a physical component represented by the building information modeling data; receive user input relative to the displayed digital model from an input device, the user input indicative of a selection of a physical component represented by the building information modeling data; modify a parameter of the digital model to generate a filtered digital model based on the user input, the filtered digital model representative of the physical component represented by the building information modeling data; and transmit the filtered digital model over a communications interface to a cloud-based service through which the filtered digital model representative of the physical component is shared across multiple devices.

Each component may include additional, different, or fewer components. For example, the field management system 300 may only include the BIM module 316. In another example, the mobile device 14 may only include the processor 202, the main memory 212, the communication infrastructure 204, and the display unit 208. In still another example, the cloud-based service 20 may include a server that includes a processor and a memory, where the memory includes the BIM module 316.

In yet another example, the BIM module 316 may include a communications module configured to communicate over a communication interface such as the communication interface 228 of the mobile device 14. The communications module may transmit and/or receive data to and/or from the cloud based server 20 or other server. The communication module may, for example, communicate models, such as the filtered digital module and/or the BIM data.

The system 300 may be implemented in many different ways. Each module, such as the commissioning module 310, the BIM module 316, the database 317, the rendering module 332, the interaction module 334, and the communications module, may be hardware or a combination of hardware, software, and/or firmware. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 212, for example, that comprises instructions executable with the processor 202 or other processor to implement one or more of the features of the module. When any of the modules includes the portion of the memory that comprises instructions executable with the processor, the module may or may not include the processor. In some examples, each module may only be the portion of the memory 212 or other physical memory that comprises instructions executable with the processor 202 or other processor to implement the features of the corresponding module without the module including any other hardware. Because each module includes at least some hardware even when the included hardware comprises software and/or firmware, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various modifications of the invention and many further embodiments thereof, in addition to those shown and described herein, will become apparent to those skilled in the art from the full contents of this document.

What is claimed is:

1. A computing device comprising:
   a processor connected to memory; and
   a module stored on a non-transitory computer readable medium and configured with instructions that when executed by the processor cause the processor to:
   determine characteristics of the computing device, wherein the characteristics comprise hardware and software capabilities of the computing device and connectivity of the computing device to a cloud-based service, wherein the computing device comprises a mobile device with a touchscreen display;
   retrieve a reduced complexity version of a building information model as building information modeling data from the cloud-based service over a network based upon the characteristics, wherein the reduced complexity version corresponds to at least one of reducing geometry counts of the building information model, compression of the building information model, or replacing identical instances of objects within the building information model with pointers;
   convert the building information modeling data into a digital model;
   render an image of a physical component represented by the building information modeling data on the touchscreen display of the computing device based upon the digital model;
   receive user input relative to the image, the user input indicating selection of the physical component represented by the building information modeling data and comprising an annotation to associate with the physical component;
   modify the digital model to generate a modified digital model based on the user input, the physical component represented by the modified digital model, wherein the annotation is attached to the modified digital model to associate the annotation with the physical component, wherein the physical component, as modified by the user input, is rendered on the touchscreen display; and transmit the modified digital model over a communications interface to the cloud-based service through which the modified digital model representative of the physical component is shared for display by multiple devices, wherein the attachment of the annotation to the modified digital model triggers transmission of a workflow issue transaction notification over the network to a remote computing device of a responsible party for addressing an issue made note of by the annotation in the modified digital model.

2. The computing device of claim 1, wherein the instructions cause the processor to receive user data and associate the user data, in the modified digital model, with the physical component.

3. The computing device of claim 1, wherein the reduced complexity version corresponds to a replacement of identical instances of objects within the building information model with pointers.

4. The computing device of claim 1, wherein the reduced complexity version corresponds to a reduction of geometry counts of the building information model.

5. The computing device of claim 1, where the building information modeling data comprises adapted building information model data obtained by pre-processing a baseline building information model for delivery to the device.

6. The computing device of claim 1, where the building information modeling data comprises a grouped object that aggregates multiple underlying objects into a distinct entity in the modeling data.

7. A method comprising:
determining, by at least a processor, characteristics of a first device, wherein the characteristics comprise hardware and software capabilities of the first device and connectivity of the first device to a cloud-based service, wherein the first device comprises a mobile device with a touchscreen display;

retrieving, by at least the processor, a reduced complexity version of a building information model as building information modeling data from the cloud-based service over a network based upon the characteristics, wherein the reduced complexity version corresponds to at least one of reducing geometry counts of the building information model, compression of the building information model, or replacing identical instances of objects within the building information model with pointers;

converting, by at least the processor, the building information modeling data into a digital model;

rendering, by at least the processor, an image of a physical component represented by the building information modeling data on the touchscreen display of the first device based upon the digital model;

receiving, by at least the processor, user input indicating a selected point of interest in the building information modeling data and comprising an annotation to associate with the selected point of interest, wherein the selected point of interest includes the physical component;

modifying, by at least the processor, a parameter of the digital model to generate a modified digital model based on the user input comprising a modification to the physical component, the modified digital model capturing the selected point of interest in the building information modeling data, wherein the annotation is attached to the modified digital model to associate the annotation with the physical component, wherein the physical component, as modified by the user input, is rendered on the touchscreen display; and sharing, by at least the processor, the selected point of interest in the building information modeling data by transmitting the modified digital model from the first device to the cloud-based service through which the modified digital model representative of the physical component is shared for display by multiple devices, wherein the attachment of the annotation to the modified digital model triggers transmission of a workflow issue transaction notification over the network to a remote computing device of a responsible party for addressing an issue made note of by the annotation in the modified digital model.

8. The method of claim 7 further comprising rendering the image of the physical component included in the selected point of interest differently than another physical component represented by the modified digital model.

9. The method of claim 7 wherein receiving the user input comprises receiving scanned item data from a bar code scanner, the scanned item data read from a bar code on the physical component by the bar code scanner, and the scanned item data indicating that the physical component is the selected point of interest in the building information modeling data.

10. The method of claim 7 further comprising displaying a list of attributes of a selected physical component included in the selected point of interest and displaying a rendered image of the selected physical component.

11. The method of claim 7 further comprising receiving, from a camera of the first device, a two-dimensional image of the selected point of interest, and including the two-dimensional image in the modified digital model that is shared through the cloud-based service.

12. The method of claim 11 further comprising alternating display of the two-dimensional image of the selected point of interest and the image rendered from the modified digital model on the touchscreen display of the first device.

13. The method of claim 11 further comprising including annotations on the two-dimensional image of the selected point of interest.

14. The method of claim 7, wherein the modified digital model indicates an issue with a piece of equipment or physical system for which a user of the second device is responsible, the selected point of interest including the piece of equipment or physical system.

15. A non-transitory computer-readable medium storing computer-executable instructions that when executed by a processor of a computer causes the processor to:

determine characteristics of a computing device, wherein the characteristics comprise hardware and software capabilities of the computing device and connectivity of the computing device to a cloud-based service, wherein the computing device comprises a mobile device with a touchscreen display;

retrieve a reduced complexity version of a building information model as building information modeling data from the cloud-based service over a network based upon the characteristics, wherein the reduced complexity version corresponds to at least one of reducing geometry counts of the building information model, compression of the building information model, or replacing identical instances of objects within the building information model with pointers;

convert the building information modeling data into a digital model;

render an image of a physical component represented by the building information modeling data on the touchscreen display of the computing device based upon the digital model;

receive user input relative to the image, the user input indicative of a selection of the physical component represented by the building information modeling data and comprises an annotation associated with the physical component;

modify a parameter of the digital model to generate a modified digital model based on the user input comprising a modification to the physical component, the modified digital model representative of the physical component represented by the building information modeling data, wherein the annotation is attached to the modified digital model to associate the annotation with the physical component, wherein the physical component, as modified by the user input, is rendered on the touchscreen display; and transmit the modified digital model over a communications interface to the cloud-based service through which the modified digital model representative of the physical component is shared across multiple devices, wherein the attachment of the annotation to the modified digital model triggers transmission of a workflow issue transaction notification over the network to a remote computing device of a responsible party for addressing an issue made note of by the annotation in the modified digital model.

16. The non-transitory computer-readable medium of claim 15, wherein the instructions further comprise instructions to receive user data and associate the user data with the physical component.

17. The non-transitory computer-readable medium of claim 15, wherein the instructions cause the processor to receive annotations related to the physical component and associate the annotations with the physical component.

18. The non-transitory computer-readable medium of claim 17, wherein the instructions cause the processor to cause a notification of an issue addressable in a workflow transaction to be transmitted, the notification transmitted based on the selection of the physical component and association of the annotations with the physical component.

19. The non-transitory computer-readable medium of claim 18, wherein the notification includes the modified digital model.

20. The non-transitory computer-readable medium of claim 15, wherein the instructions cause the processor to render the image of the physical component differently than another physical component represented by the modified digital model.

* * * * *